United States Patent [19]

Sukopp et al.

[11] 4,323,278

[45] Apr. 6, 1982

[54] SEAT FOR VEHICLES, IN PARTICULAR TWO-DOOR PASSENGER AUTOMOBILES

[75] Inventors: Wolfgang Sukopp, Wolfsburg; Holger Schmidt, Brechtorf; Wilfried Schwanz, Ahnsen, all of Fed. Rep. of Germany

[73] Assignee: Volkswagenwerk Aktiengesellschaft, Wolfsburg, Fed. Rep. of Germany

[21] Appl. No.: 123,571

[22] Filed: Feb. 22, 1980

[30] Foreign Application Priority Data

Mar. 5, 1979 [DE] Fed. Rep. of Germany ....... 2908558

[51] Int. Cl.³ ............................................ A62B 35/00
[52] U.S. Cl. .................................. 297/481; 280/801; 280/808; 297/379; 297/483
[58] Field of Search ............... 297/483, 484, 485, 468, 297/379, 481; 280/801, 802, 803, 804, 807, 808

[56] References Cited

U.S. PATENT DOCUMENTS 4,060,260 11/1977 Collins ................................ 280/808

FOREIGN PATENT DOCUMENTS

| 1794574 | 8/1958 | Fed. Rep. of Germany . |
| 1227347 | 10/1966 | Fed. Rep. of Germany . |
| 2531227 | 2/1977 | Fed. Rep. of Germany ...... 297/483 |
| 2610343 | 9/1977 | Fed. Rep. of Germany ...... 297/481 |
| 2710754 | 9/1977 | Fed. Rep. of Germany ...... 297/481 |
| 2810577 | 9/1979 | Fed. Rep. of Germany ...... 297/483 |
| 1434704 | 5/1976 | United Kingdom ................ 297/483 |

*Primary Examiner*—James T. McCall
*Attorney, Agent, or Firm*—Brumbaugh, Graves, Donohue & Raymond

[57] ABSTRACT

The seats of two-door passenger automobiles are provided with a tiltable backrest and a three-point safety belt. An actuating element for releasing the backrest so it can tilt is designed as a guide element for guiding the end of the safety belt associated with the shoulder of the vehicle occupant into a repository position when it is released by the occupant, which repository position is at a more convenient location than that possible without the guide element.

3 Claims, 1 Drawing Figure

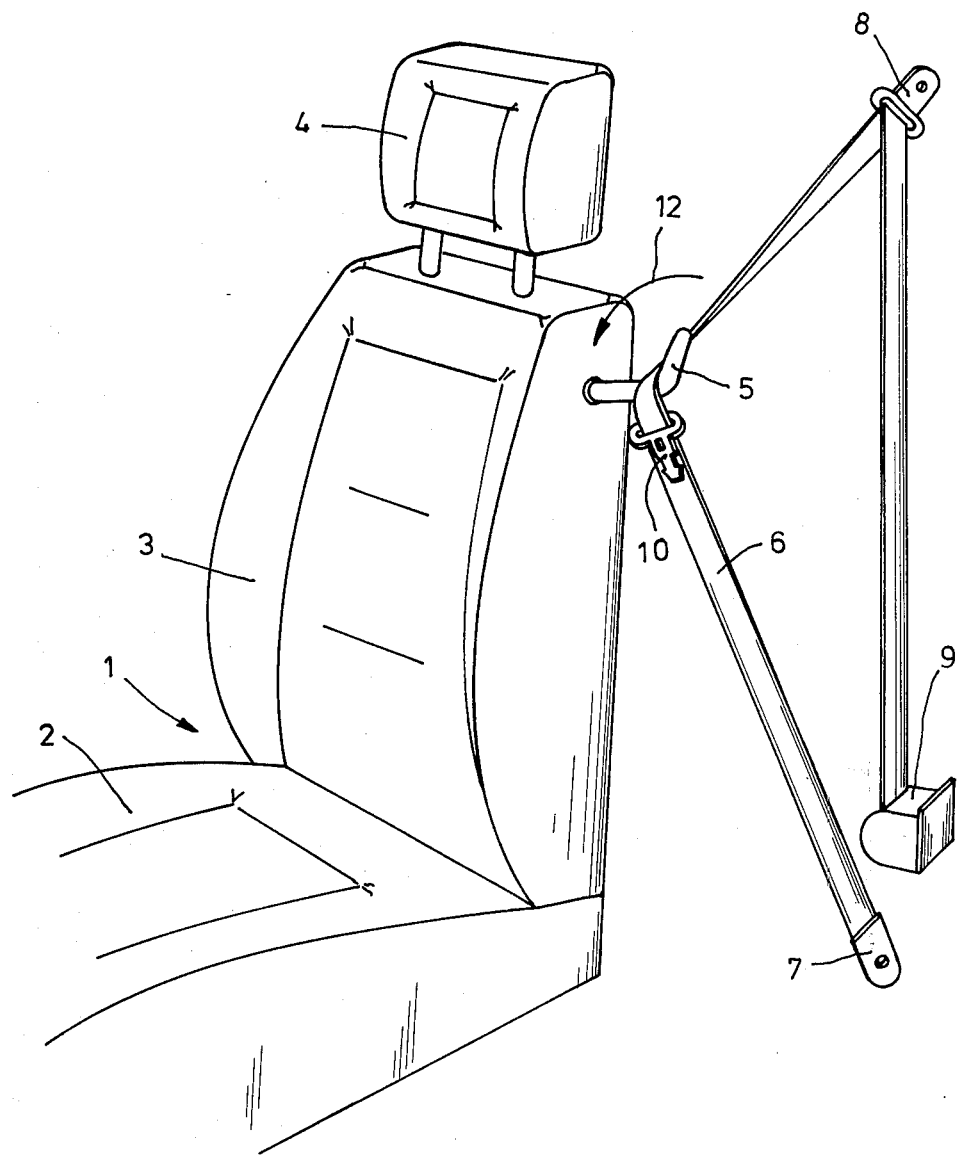

SEAT FOR VEHICLES, IN PARTICULAR TWO-DOOR PASSENGER AUTOMOBILES

BACKGROUND OF THE INVENTION

The invention concerns a seat for vehicles and, more particularly, a seat for two-door passenger automobiles which is equipped with a backrest tiltable relative to the seat surface, an actuating element, located on the side of the backrest adjacent the vehicle door, that releases a locking mechanism which prevents the backrest from tilting, and an associated three-point safety belt system provided with a winding device.

Customarily, two-door passenger automobiles are provided with a tiltable backrest on the front seats so as to facilitate access to the back seats. Tilting of the backrest is obtainable by operation of actuating element, provided on the side of the backrest, to release a locking element for the backrest so it can be tilted. In general, such two-door vehicles have relatively wide doors, so the safety belts associated with the front seats, at least on the side of the vehicle seat facing the vehicle door, are anchored far behind the vehicle seat, generally on the door post (B column). In the released state, the safety belts, which are customarily designed as automatic three-point belts, are therefore placed in an unfavorable position on the door post where they cannot be easily reached by the passenger occupying the front seat.

SUMMARY OF THE INVENTION

It is the purpose of the invention to avoid the shortcomings of prior arrangements with respect to the use of a seat belt in a two-door car and to create a seat suitable for providing the occupant with the possibility of quickly and easily grasping the safety belt for the purpose of putting it on.

This purpose is attained in accordance with the invention in that a three point safety belt system having a belt winding device is used with an actuating element that unlocks the backrest to permit it to tilt, and the actuating element is designed as a guide element that guides the safety belt into a repository position upon retraction of it by the belt winding device, once the belt has been taken off the occupant. The actuating element may be arranged on the upper edge of the backrest and can be designed as a hook-shaped upwardly-directed interception grip. Thus, the interception grip is utilized both for releasing the backrest and for intercepting and guiding the safety belt into the repository position on retraction, in which position it can be easily gripped by the passenger in order to put it on again . For the purpose of providing access to the back seats, the safety belt can be easily lifted off of the interception grip, which is upwardly open, so that the belt can be retracted into its previous release position where it does not obstruct access to the back seat.

BRIEF DESCRIPTION OF THE DRAWING

The foregoing and other features of the present invention will be more readily apparent from the following detailed description and drawing of an illustrative embodiment of the invention, which drawing illustrates a diagramatic view of a vehicle seat with an associated seat belt and an interception grip in accordance with the invention.

DESCRIPTION OF AN ILLUSTRATIVE EMBODIMENT

In the drawing, a front seat 1 of a two-door vehicle has a seat surface 2 and a backrest 3 that is tiltable for the purpose of facilitating access to the back seats of the vehicle. A headrest 4 is arranged at the top of the backrest.

The backrest 3, on the side facing the vehicle door (not shown), i.e. the near side in the drawing, is provided with an actuating element 5 close to its upper edge, which element is rendered as a hook-shaped interception grip that is bent upwardly. The interception grip 5 serves to intercept and guide a safety belt 6 associated with the vehicle seat 1 when the said seat belt is retracted into the repository position shown in the drawing.

The safety belt 6 is in the form of a customary three-point safety belt with its lower end fastened by means of a belt fitting 7 on the bottom end of the door post or B-column (not shown). The other end of the safety belt is wound on an automatic winding device 9 which at all times maintains the safety belt under a given pretension so that, in its restraining position, the belt is tightly applied to the body of the vehicle occupant, and, when it is taken off, it is automatically retracted into the repository position. The winding device is also fixed on the door post, in general somewhat above the level of the belt fitting 7. From winding device 9 the belt extends essentially vertically as far as a guide fitting 8 which is likewise maintained on the door post, but at the level of the occupant's shoulder. As is customary in belt arrangements of this kind, the safety belt also carries a displaceable and insertable lock tongue 10 which, for the purpose of application of the belt, is grasped by the vehicle occupant and inserted into a belt lock (not shown) arranged on the other side of the seat in the pelvic region, i.e. on the far side in the drawing. The belt lock may be fixed directly on the lateral frame of the seat surface or on a tunnel extending along the center of the vehicle.

In a two-door vehicle the door post, on which is anchored the guide fitting 8 of the safety belt, is placed relatively far behind the backrest 3 of the vehicle seat. As a result, the belt tongue 10, which in the release position of a conventional seat belt arrangement is located on the door post, can only be grasped by the occupant of the front seat with great difficulty, when he attempts to apply the safety belt to his body. However, if as in accordance with the invention, the actuating element 5 for release of the backrest locking mechanism is rendered as an interception grip that catches and guides the belt on retraction into the repository position shown, the safety belt 6 and the lock insertion tongue 10 that is displaceable with it, are hooked by this grip so that the insertion tongue can be grasped easily and comfortably by the occupant when the belt has to be applied again. The interception grip, in order to release the backrest locking mechanism, can swivel as indicated by the arrow 12 and is upwardly open so that the belt can be easily lifted over the grip to provide vehicle occupants or luggage with access to the back seats. Moreover, the interception grip 5 does not obstruct the course of the belt in its applied state, in that only the lateral sliding-off of the belt past the backrest is prevented.

If the invention is viewed as a whole, it can be seen that it offers a relatively simple arrangement for obtaining an easy an comfortable application of the safety belt in two-door vehicles. As a result, the likelihood of the vehicle occupant making use of the belt, even during short trips, is enhanced and promoted, whereby the danger of injury in road traffic is decreased.

While the invention has been particularly shown and described with reference to a preferred embodiment thereof, it will be understood by those skilled in the art that various changes in form and details may be made therein without departing from the spirit and scope of the invention.

We claim:

1. A seat for vehicles, such as two-door passenger automobiles, with a backrest which is tiltable relative to a seat surface, an actuating element for releasing a backrest locking mechanism, which actuating element is arranged at the side of the backrest facing the vehicle door, and an associated three-point safety belt which is provided with a winding device, said safety belt having a portion associated with the shoulder of the vehicle occupant and running over a guide fitting arranged behind the backrest on the vehicle frame adjacent the door, characterized in that the actuating element is also designed as a guide element for guiding the safety belt on retraction into a repository position where a part of it is along side the backrest and can be easily grasped by the vehicle occupant.

2. A seat as claimed in claim 1, characterized in that the guide element is arranged on the upper edge of the backrest.

3. A seat as claimed in claims 1 or 2, characterized in that the guide element is designed as a hook-shaped, upwardly-bent, interception grip.

* * * * *